United States Patent Office.

EUGENE PAVY, OF PARIS, FRANCE.

Letters Patent No. 104,638, dated June 21, 1870.

IMPROVEMENT IN THE MANUFACTURE OF USEFUL AND ORNAMENTAL FABRICS FROM VEGETABLE AND ANIMAL FIBERS.

The Schedule referred to in these Letters Patent and making part of the same.

*To all whom it may concern:*

Be it known that I, EUGENE PAVY, of Paris, in the Empire of France, have invented Improvements in Treating and Preparing certain Vegetable and Animal Fibers, to manufacture a new description of fabric or stuff, applicable to various useful and decorative purposes; and I do hereby declare that the following is a full and exact description thereof.

My invention relates to certain processes or modes of treating and preparing certain vegetable and animal fibers, in order to produce pulp, and to manufacture from this pulp a felted paper fabric or stuff, applicable to various useful and decorative purposes.

The vegetable matters which I prefer to employ are, plants of the nettle, corchorus, musa, or plantain tribes, the barks of the mulberry tree, and others, crotolarias, hibiscii, malvacious plants, or plants of the mallow tribe, asclepiades, yercum calatropsis, daphne cannabina, broussonetia papyrifera, saccharine plants, flaxes, hemps, cottons, and, in general, all indigenous or exotic plants, possessing a sufficiently felty texture, to be employed, either alone or mixed with others, in the manufacture of felted-paper fabric or stuff.

The animal matters which I employ are, wool, silk, bulls' pizzles, skins, and others.

I also employ mineral matters, viz: powdered gold, silver, mica, or others, capable of producing, for certain purposes, brilliant, sparkling effects, such as are seen on japanned papers.

When the matters of which I compose my felted stuff are too long, I cut or divide them, in order to facilitate their lixiviation or lye-washing, but this operation can be dispensed with, when desired. The lexiviation or lye-washing can be accomplished in two manners, according to the matters operated upon, or the time at disposal. When the matters disintegrate easily, such as plants of the nettle tribe, flaxes, hemps, cottons, and barks of the mulberry genus, I wash them simply with milk of lime, or, preferably, with caustic alkali, at 2° or 3° Baumé, and, as nearly as possible, under a pressure of steam, of from three to four atmospheres, for about three hours. They are then washed in passing through the washing-trough, until the parts are reduced to a length of from one-twelfth to one-fifth of an inch; they are then bleached in the bleaching-trough, by any of the processes used for bleaching rags.

When matters which are hard and not easily disintegrated are to be operated upon, such as plants of the musa or plantain genus, corchorus, hibiscii, crotolarias, certain oarks, daphne cannabina, waste stalks of flax and hemp, I submit them, in a close vessel, to a pressure of steam of from six to eight atmospheres, for about four hours, employing, preferably, a solution of caustic soda, at about 6° to 8° Baumé, when the matters become sufficiently disintegrated, and are ready for bleaching immediately.

This mode having the disadvantage of somewhat affecting the strength of the fibers, I prefer the system of washing in milk of lime, or weak alkali, as in operating with ordinary rags; but, as this mode only half disintegrates the matters, it is impossible to proceed directly to the bleaching process, and I therefore proceed as follows:

The matters are submitted to the action of gaseous chlorine, as is the custom with rags. The matters, instead of becoming bleached directly, assume a bright yellow-red color. In this state they are subjected to the washing and bleaching-troughs, and, after a thorough washing, I pour into the trough, for two hundred weight of pulp, about two and one-half to five gallons of caustic alkali, at about 4° Baumé. This second washing or lye, which may be either warm or cold, rapidly causes the most perfect disintegration of all the intercellular bodies of the vegetable matters, and the operation is so complete that the waters rapidly change from a white to a black tinge.

I finish by a thorough washing, and by pouring into the trough, when the water has again become clear, about one-fourth of a pint of sulphuric acid.

The cellulose or cellular matter being now pure, for about two hundred weight of pulp, from three to six pails of chloride of lime, or of soda, of about 4° Beaumé, are poured into the trough, and, when it is nearly white, it is washed a little, and about two pounds of crystals of soda, and a like quantity of sulphate of alumina, previously dissolved, are added to the trough. The bleaching is terminated by pouring into the trough one-fourth of a pint of sulphuric acid. The matter is washed for a moment, and there is obtained, in this manner, a most beautiful white. I employ the same bleaching process after the two first modes of lye-washing before washing.

I should mention, here, another method of bleaching the matters, the lixiviation of which is not complete, or the bleaching of which can only be produced by the action of hydrochloric-acid gas.

This is an operation which, however perfect in principle, is, nevertheless, rather costly. After a washing, either in milk of lime or alkali, when the matters will not bleach in the ordinary processes or in chloride of lime at 4°, and when, after having thrown into the pulp half a pint of sulphuric acid, the matter is not of a satisfactory whiteness, I wash it immediately, and I pour into the trough from two and one-half to five gallons of caustic soda, in order to effect the decomposition of the gummy resinous matters which prevent the bleaching, and, when the liquid of the bath has become black, I wash again and recommence the bleaching, as before described.

As is evident, the last process is intended to effect the bleaching in the troughs of the more strongly-resisting matters by means of an artificial action of gas, which permits the alkali to act with almost as much efficaciousness as by the action of gas in the close chamber, and to make up for any ill success of lye-washing operations.

The employment of the chemical matters indicated is nothing new; what is new is what I call the second washing in caustic alkali, after the treatment with gaseous chlorine. For this operation, so simple in appearance, will permit, henceforth, of the extraction of pure cellulose matters from all vegetable materials, and even from all those which industrial science has hitherto considered as impractible, and it is by the aid of these processes that I have been able to make, with the most common substances, such as jute or corchorus, waste of flax or hemp, and all other matters thrown aside, felted fabrics or tissues, having all desirable strength and elasticity, to replace other fabrics in a great number of uses.

I disintegrate bulls' pizzles and skins with milk of lime, and I bleach them with sulphur vapors, as also wool and silk.

The matters of which I compose my felts are reduced or triturated by heating-engines or by grindstones, pestles, mallets, or otherwise, care being taken that the filaments, in separating, be kept to a length of from one-twentieth to one-fifth of an inch at least, in order that very strong felts may be obtained, whether by means of vegetable matters, separately or mixed, or animal matters, according to the solidity, the consistence, the pliancy, elasticity, and silkiness I desire to obtain, and the application I desire to make.

Thus for my best qualities of felts for clothing, furniture, and table-cloths, I, preferably, use China grass, mulberry, plantain, and corchorus, to give silky effects to the felted fabric, and I use hemp, flax, cotton, and a great many other matters, to imitate cotton, linen, and hempen stuffs.

For the most part, I dye or color the felts in the troughs, and size and render them non-inflammable there, also, when desirable, and I use the ordinary processes. When I desire to obtain very supple felt, I pour into the finishing-trough, for two hundred pounds of pulp, about two to six pounds of white palm soap, or any other soap, before the descent of the pulp in the vessel.

The pulp, in this state, composed of animal or vegetable matters, or a mixture of both, is converted into paper or felt, either by means of a paper-machine, by hand apparatus, or by the processes employed in ordinary felting.

I proceed, now, to describe more fully the different applications of my felt fabrics.

My object in manufacturing these fabrics is to dispense with spinning and weaving, in some applications, where this work is not indispensable, and to add, in all cases, to that which exists already, a new natural product, to occupy a place in substitution for ordinary fabrics and colored papers. Thus I apply these felts to the production of dresses, petticoats, mantles, table-linen, linen-drapery, hats, bonnets, caps, shoes, curtains, hangings, tapestry, blinds, furniture-coverings, table-covers, carpets, linings, substitutes for leather hat-linings, imitations of china paper for engraving, lithography, and printing.

Curtain's bands, cords, and fringes, as well as the tassels of ornamental trimmings, may be made with the felted paper, colored, twisted, and arranged as is the custom in ordinary trimmings.

The felt fabrics, for the greater part of the applications above mentioned, are white, tinted, colored, or printed, in any shade and design. They are smooth, velvety, embossed, in order to imitate lace, guipure, goffer, and filigree-work, in such manner as to produce the effects of embroidered, embossed, Damascened, and velveted fabrics.

The linings of the dresses, petticoats, and curtains, are, preferably, made of felted fabric, but they can be lined with tarlatan, muslin, or light calico, or, in the same manner, the original fabric can be used in the production of the fabric, and, also, the felted fabrics may predominate, and, for furniture-covers, for example, it would be necessary to strengthen them by lining.

The felt fabrics are stitched or pasted. In their use as hangings or tapestry in replacing colored paper, I have the object of preventing, for the most part, the use of paste by nailing or hanging like stuffs, so that the hanging is all one piece, curtain, wall-hanging, table-covers, furniture-covers, and carpet all being a perfect match. I obtain imitations of leather and parchment by causing the felt fabrics to imbibe siccative oils, such as tar, linseed, isinglass, India rubber, naphtha, or varnishes, or acids. The felts are manufactured of different thicknesses. They are printed with oil in all shades and designs. They are punched or stamped in imitation of cordovan leather, moroccos, mole-skins, oil-cloths, and parchments, and they fulfil all the uses of those products. I also make impermeable blinds with them, perforated with holes, so that one can see from within without being seen from without, and which allow the air to penetrate. They can be painted or printed in all colors or designs.

I can also make bags, to preserve fruit, and carpets, with oil paintings. Felt fabrics, whether of animal or vegetable matters, answer equally well for small or large cartridges, leather bottles, calking of ships, and other purposes.

The felt composed of bulls' pizzles is prepared as the vegetable matters, as to the trituration and fabrication; they are unbleached, white, or of all shades, in imitation of parchment, morocco, asses' skins, and constitute an application, entirely new, of this matter, to clothing, furniture, and book-binding. Powdered gold, silver, or mica are employed, mixed with the pulp in the troughs.

What I claim as new, and desire to secure by Letters Patent, is—

1. A felted fabric, produced from animal or vegetable fibers, (either or both combined,) said fibers having been treated and prepared substantially in the manner herein set forth.

2. Submitting the fiber to what I have called the second washing, in caustic alkali, after having treated the same with gaseous chlorine, substantially as described.

EUGENE PAVY.

Witnesses:
H. BONNEVILLE,
F. OLCOTT.